(12) United States Patent
Woodnorth et al.

(10) Patent No.: US 6,555,266 B1
(45) Date of Patent: Apr. 29, 2003

(54) ALKALINE CELL WITH IMPROVED CASING

(75) Inventors: Douglas J. Woodnorth, Needham, MA (US); Barbara Brys, Bedford, MA (US)

(73) Assignee: The Gillette Company, Boston, MA (US)

( * ) Notice: Subject to any disclaimer, the term of this patent is extended or adjusted under 35 U.S.C. 154(b) by 490 days.

(21) Appl. No.: 09/106,625

(22) Filed: Jun. 29, 1998

(51) Int. Cl.[7] .................................................. H01M 2/02
(52) U.S. Cl. ........................ 429/164; 429/168; 429/229; 429/224; 429/206
(58) Field of Search ................................. 429/206, 209, 429/224, 229, 245, 164, 168

(56) References Cited

U.S. PATENT DOCUMENTS

| | | | | |
|---|---|---|---|---|
| 3,751,301 A | * | 8/1973 | Kilduff | 136/26 |
| 3,764,392 A | * | 10/1973 | Kuwazaki et al. | 136/107 |
| 4,119,771 A | * | 10/1978 | Saridakis | 429/178 |
| 4,760,002 A | | 7/1988 | Schneider et al. | 429/206 |
| 4,910,096 A | | 3/1990 | Junkers et al. | 428/610 |
| 5,302,473 A | * | 4/1994 | Bennett | 429/160 |
| 5,721,072 A | * | 2/1998 | Mototani et al. | 429/229 |
| 5,814,419 A | * | 9/1998 | Kenyon et al. | 429/165 |

FOREIGN PATENT DOCUMENTS

| | | | |
|---|---|---|---|
| CA | 1263697 | 12/1989 | 319/90 |

* cited by examiner

Primary Examiner—Patrick Ryan
Assistant Examiner—R Alejandro
(74) Attorney, Agent, or Firm—Barry D. Josephs; Paul I. Douglas; Thomas G. Krivulka

(57) ABSTRACT

The invention relates to electrochemical cells having a metal current collector, particularly zinc/$MnO_2$ primary alkaline cells wherein the cathode metal current collector is the cell's steel casing. The present invention is directed to a coating on the current collector, such as the inside surface of the steel casing of an alkaline cell, to improve the cell's performance, particularly when it is used for high power applications. In accordance with the invention the current collector or inside surface of the steel casing for the cell, is preferably preplated with nickel, then plated with a layer of cobalt or cobalt alloy, and subsequently coated with a layer of carbon over the cobalt layer. The carbon may be applied from a carbon/solvent coating mixture which is dried to evaporate the solvent carrier. The service life of the cell is improved, particularly during high power applications.

20 Claims, 2 Drawing Sheets

ALKALINE CELL WITH IMPROVED CASING

The invention relates to electrochemical cells having a metal current collector such as the steel casing of an alkaline cell. The invention relates to metal current collectors, particularly the steel casing of an alkaline cell, which may be coated with a layer of cobalt and a layer of carbon over the cobalt to extend the useful service life of the cell.

Conventional alkaline electrochemical cells are formed of a cylindrical casing. The casing is initially formed with an enlarged open end. After the cell contents are supplied, an end cap with insulating plug is inserted into the open end. The cell is closed by crimping the casing edge over an edge of the insulating plug and radially compressing the casing around the insulating plug to provide a tight seal. A portion of the cell casing forms the positive terminal.

The cell contents of a primary alkaline cell typically contain zinc anode active material, alkaline electrolyte, a manganese dioxide cathode active material, and an electrolyte permeable separator film, typically of cellulose. The anode active material comprises zinc particles admixed with zinc oxide and conventional gelling agents, such as carboxymethylcellulose or acrylic acid copolymers, and electrolyte. The gelling agent holds the zinc particles in place and in contact with each other. A conductive metal nail, known as the anode current collector, is typically inserted into the anode active material. The alkaline electrolyte is typically an aqueous solution of potassium hydroxide, but other alkali solutions of sodium or lithium hydroxide may also be employed. The cathode material is typically of manganese dioxide and may include small amounts of carbon or graphite to increase conductivity.

Canadian patent 1263697 discloses that the inside surface of a steel casing for an alkaline cell, such as a nickel plated steel casing, may be coated with a carbon lacquer coating which dries to a hard carbon coating to provide a low resistance current path between the $MnO_2$ cathode active material and the cell casing.

U.S. Pat. No. 4,760,002 discloses that the inside surface of the steel casing of an alkaline cell, such as a nickel plated steel casing may be coated with a layer of cobalt or cobalt containing compounds such as Ni/Co or Ni/Co/Fe alloy. The reference teaches that the cobalt may be deposited on the steel casing by reducing a cobalt salt solution, preferably by electrochemically reducing cobalt ions in solution. The resulting cobalt coating reduces the electrical contact resistance between the $MnO_2$ cathode active material and cell casing.

Since commercial cell sizes are fixed, it has been desirable to, attempt to increase the capacity, i.e., the useful service life of the cell by increasing the surface area of the electrode active material and by packing greater amounts of the active material into the cell. This approach has practical limitations. If the active material is packed too densely into the cell this can reduce the rate of electrochemical reaction during discharge, in turn reducing service life. Other deleterious effects such as polarization can occur, particularly at high current drain (high power applications). Polarization limits the mobility of ions within the electrode active material and within the electrolyte, which in turn reduces service life. The contact resistance between the $MnO_2$ cathode active material and the cell casing of an alkaline cell also reduces service life. Such contact resistance losses typically increases, particularly as the cell is discharged during high power applications (between about 0.5 and 1 watt). Modern electronic devices such as cellular phones, digital cameras and toys, flash units, remote control toys, camcorders and high intensity lamps are examples of such high power applications. Thus, it is desirable to provide a way of reliably increasing the useful service life of conventional primary alkaline cells particularly for cells to be used in high power applications, without noticeably increasing polarization effects or otherwise adversely affecting cell performance.

Accordingly it is desirable to extend the useful service life of electrochemical cells, particularly alkaline cells intended for high power applications.

It is desirable to find coatings for the inside surface of a conventional steel casing for an alkaline cell which reduces the contact resistance and increases cell life, particularly during high power applications.

SUMMARY OF THE INVENTION

The present invention is directed to a coating on the inside surface of the steel casing of an electrochemical cell, particularly an alkaline cell, to improve the cell's performance. In accordance with the invention a metal current collector which may be in the form of a metal 'surface such as the inside surface of a steel casing for the cell, preferably preplated with nickel, is plated with a layer of cobalt or cobalt alloy, and then subsequently coated with a layer of carbon. The tandem cobalt and carbon coatings of the invention may be applied to other metal current collectors, preferably those which have been preplated with nickel. Such other current collectors, for example, may be in the form of a wire mesh (woven or unwoven), expanded metal foil, metal sheets, or metallic fibers, or metallic particles which are preferably preplated with nickel. (The current collector is a metal surface in physical contact with an electrode (anode or cathode) and is electrically connected to a cell terminal. The current collector functions to provide a direct path of current flow from the electrode to a cell terminal.)

In an alkaline cell the cathode current collector is preferably the cell's steel casing. In accordance with the invention a cobalt layer may be electrodeposited onto the inside surface of the cell's steel casing. Preferably the steel casing has been preplated with nickel. Cobalt alloys such as Ni/Co or Ni/Co/Fe alloy may be electrodeposited in place of or in conjunction with cobalt. The cobalt plating is preferably subjected to a final heat treatment of between about 580° C. to 710° C. A carbon coating may be applied over the cobalt plating as a carbon/solvent coating. The carbon coating preferably comprises particulate carbon, solvent carrier and binder. The carbon coating upon evaporation of solvent carrier forms a hard carbon coating over the cobalt. The particulate carbon is desirably in the form of particulate carbon, graphite or acetylene black, preferably particulate graphite. The cobalt is deposited to a thickness preferably between about $0.01 \times 10^{-6}$ and $1.0 \times 10^{-6}$ meters. The dry carbon coating on the surface of the cobalt layer desirably has a thickness of between about 0.0025 and 0.076 mm.

It has been determined that if the inside surface of an alkaline cell's steel casing, preferably a nickel plated steel casing, is plated with cobalt and subsequently coated with carbon a significant improvement in the cell's service life is realized when the cell is discharged for high power application. Surprisingly, under high power application the percent improvement in service life is greater than if the nickel plated steel casing were coated with the cobalt or carbon coating alone.

The invention extends to electrochemical cells other than alkaline cells provided such cells have a steel casing, preferably a nickel plated steel casing, or other metallic current collector which comes into contact with at least one of the anode or cathode. The invention is particularly applicable to such cells wherein oxidation or corrosion of the surface of the current collector is a problem impacting on the cell's performance. In such cells the tandem cobalt and carbon coatings on the inside surface of the nickel plated steel casing can reduce the chance of oxidation or corrosion and extend the cell's service life.

BRIEF DESCRIPTION OF THE DRAWINGS

The invention will be better understood with reference to the drawings in which.

DETAILED DESCRIPTION

Figure 1:
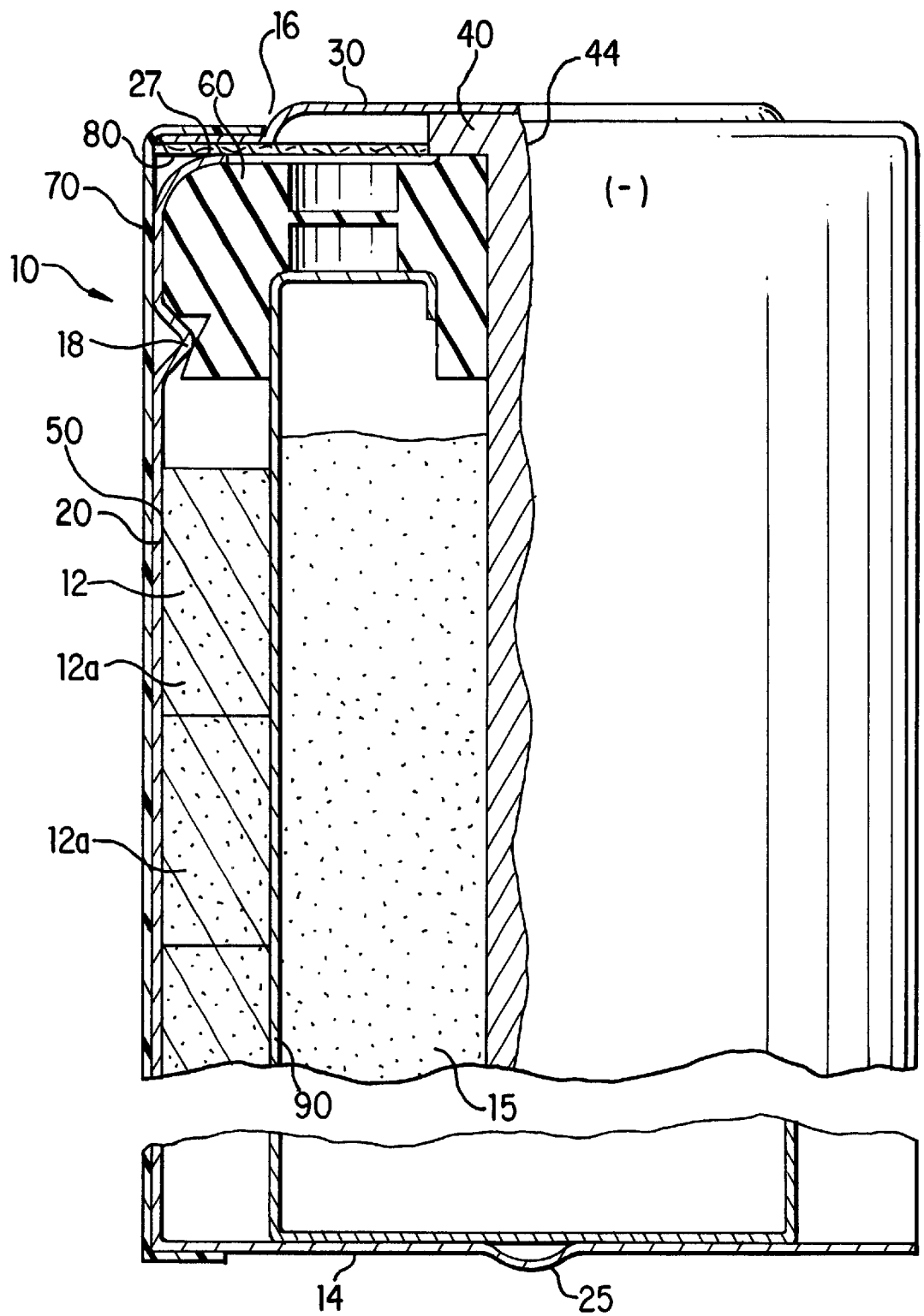
FIG. 1 is a cross sectional cut away view of an alkaline cell having a casing with inside surface coated in accordance with the invention.

A representative alkaline cell configuration is shown in FIG. 1. The alkaline cell 10 comprises a cylindrical steel casing 20, having a closed end 14 and an open end 16. The cell is filled with cathode 12 comprising $MnO_2$, and an anode 15 comprising zinc and electrolyte. The electrolyte may comprise a conventional mixture of KOH, ZnO and gelling agent. The cathode 12 may be supplied in the form of a series of compacted annular blocks 12a. The anode and cathode may be separated by a conventional ion porous separator 90, for example, comprising rayon or cellulose. After cell 10 is filled an insulating plug 60 is inserted into open end 16. The plug 60 is preferably snap fitted around circumferential step 18 as shown in FIG. 1 so that the plug locks in place into the open end 16. The peripheral edge 27 of casing 20 is crimped over the top of insulating plug 60. A paper insulating washer 80 is applied over the crimped peripheral edge 27 of casing 20. Insulating washer 80 may be a polyethylene coated paper washer. A terminal end cap 30 is welded to the head of current collector 40. The elongated current collector 40 is then inserted (force fitted) into aperture 44 of insulating plug 60 so that end cap 30 comes to rest against insulating washer 80. Conventional asphalt sealant may be preapplied around the current collector 40 before it is inserted into aperture 44. A film label 70 is applied around casing 20. The terminal end cap 30 becomes the negative terminal of alkaline cell 10 and pip 25 at the closed end of casing 20 becomes the positive terminal.

The cell 10 shown in FIG. 1 may be an AAA cell. However, the alkaline cell shown in FIG. 1 is not intended to be restricted to any particular size. Additives may be employed, as conventional, to modify the cell chemistry. Alkaline cell 10 is not intended to be restricted to any particular cell chemistry or cell size. Thus cell 10 may contain conventional alkaline cell chemistries including those which contain zero added mercury (less than 50 parts mercury per million parts total cell weight, preferably less than 10 parts mercury per million parts total cell weight) and modifications thereof. Such representative chemistries, for example, is disclosed in U.S. Pat. No. 5,401,590, herein incorporated by reference. Also, although the invention is principally directed to primary alkaline cells the anode and cathode chemistries can be adjusted so that the cells become secondary (rechargeable) cells. It is intended that the invention described herein be applicable as well to the steel casing of such secondary (rechargeable) alkaline cells.

Figure 2:
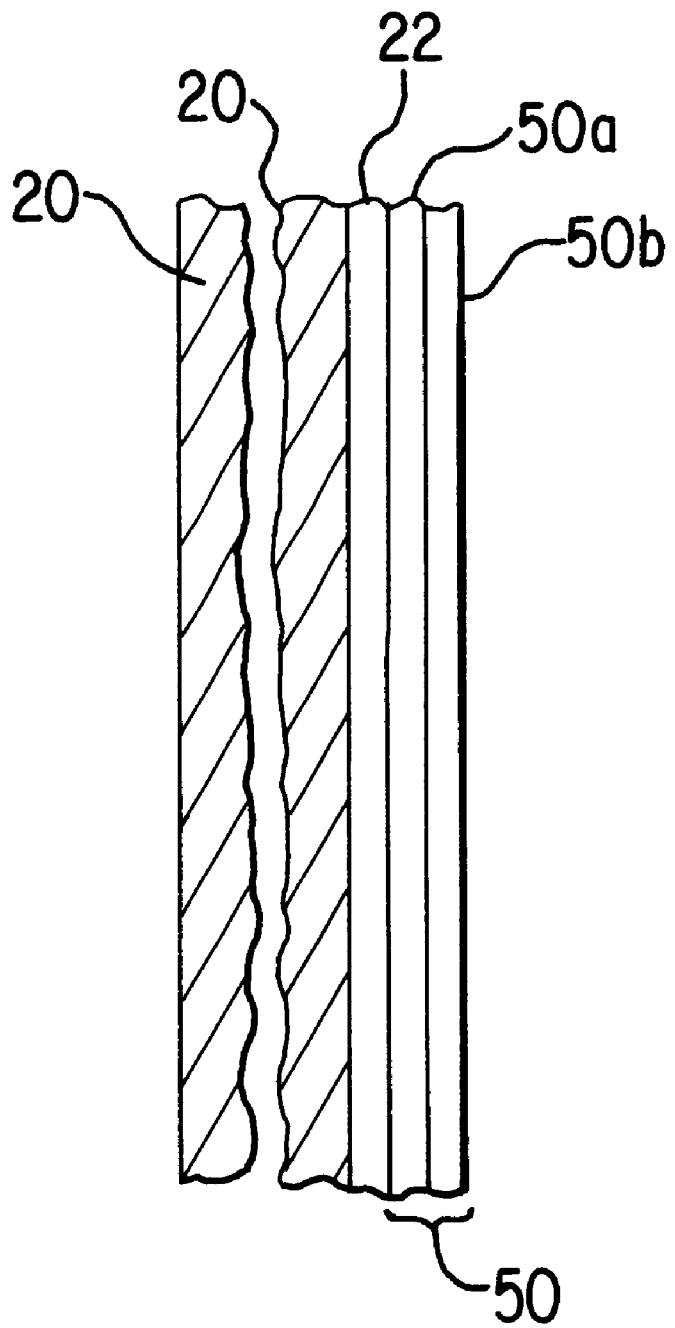
FIG. 2 is a cross sectional view of the cell's steel casing wall showing the coatings on the inside surface thereof in accordance with the invention.

In accordance with a preferred embodiment of the invention the steel casing 50 for alkaline cell 10, as shown best in FIG. 2 is plated on its inside surface with a layer 50a of cobalt (or cobalt alloy) and then subsequently coated with a layer 50b of carbon. The steel casing 50 is preferably formed of a low carbon steel (typically containing between about 0.001% to 0.070% carbon) which has preferably been preplated on both inside and outside surfaces with a layer 22 of nickel to provide a measure of protection from corrosion. The cobalt plating 50a is carried out preferably by electrodeposition as described in U.S. Pat. No. 4,910,096 herein incorporated by reference.

The nickel layer 22 and cobalt layer 50a may be electrodeposited using the following electrolytic compositions referenced in U.S. Pat. No. 4,910,096:

|  | Electrolytic Composition |
| --- | --- |
| Nickel Deposition |  |
| NiSO4.6H2O | 150–300 g/l |
| Cl (as $NaCl_2.6H_2O$) | 15–30 g/l |
| Boric acid | 40–42 g/l |
| Cobalt Deposition |  |
| $CoSO_4.7H_2O$ | 300–350 g/l |
| $CoCl_2.6H_2O$ | 40–60 g/l |
| NaCl | 15–25 g/l |
| Boric Acid | 40–42 g/l |

The steel casing is initially formed of a cold-rolled steel strip which is preplated on both inside and outside surfaces with nickel having a thickness of between about $1 \times 10^{-6}$ and $6 \times 10^{-6}$ meters, preferably between about $1.5 \times 10^{-6}$ and $5 \times 10^{-6}$ meters. A layer of cobalt or cobalt alloy is then deposited on one side of the nickel plated strip to a thickness between about $0.01 \times 10^{-6}$ and $1.0 \times 10^{-6}$ meters, preferably to a thickness of between about $0.1 \times 10^{-6}$ and $0.5 \times 10^{-6}$ meters. The nickel and cobalt layers may be electrodeposited on the steel by the method described in U.S. Pat. No. 4,910,096. After the cobalt is deposited, the steel strip is subjected to final heat treatment at a temperature of between about 580° C. and 710° C. as described in U.S. Pat. No. 4,910,096. This method of processing improves the corrosion resistance of the strips beyond that obtained with only nickel plated steel. The final heat treatment at a temperature between about 580° C. and 710° C. substantially increases the diffusion rate of the nickel and cobalt metals into the base steel. (The nickel and cobalt coating thickness recited in this application should be interpreted to mean the nickel and cobalt coating thickness prior to such final heat treatment.) This results in improved deformability of the steel and more economical processing. During the heat treatment the nickel and cobalt metals diffuse into the base steel to a depth that is several times thicker than the cobalt and nickel coating thickness, thus enhancing the corrosion resistance despite the thinness of the cobalt coating. The nickel and cobalt layers applied to the steel casing referenced in the examples submitted herein (Table 1) were applied by the above described methods, that is, as incorporated by reference herein from U.S. Pat. No. 4,910,096.

After the steel sheeting has been plated with cobalt layer 50a it may be formed into cylindrical casing 20 by conventional deep drawing methods. The inside surface of casing 20 is preferably coated with the carbon layer 50b after the casing has been formed into the cylindrical shape shown in FIG. 1. Alternatively, the cold-rolled sheet steel may be coated with carbon layer 50b after the cobalt layer 50a is electrodeposited but before the sheet is formed into a cylindrical case.

The carbon coating 50b is applied over cobalt layer 50a. The carbon coating 50b may advantageously be applied by roll coating using a solvent based carbon lacquer or by spray coating. Preferably, the carbon coating is applied in the form of a dispersion of particulate graphite in solvent carrier. The carbon dispersion may be prepared in accordance with the mixing composition described in Canadian patent 1263697. A suitable carbon coating composition may thus be one which includes carbon particles carried in a binder with a volatile (solvent) carrier. The solvent carrier is such that it will evaporate when the coating is allowed to dry at room temperature. The binder causes a hard carbon coating to form over the surface onto which it has been applied after the solvent carrier has evaporated. The dry carbon coating is electrically conductive and substantially impervious to alkaline electrolyte which typically comprises a mixture of potassium hydroxide and zinc oxide. The hard carbon coating also has the property that it does not swell in the presence of the alkaline electrolyte. The carbon particles may be in the form graphite particles, carbon black, acetylene black or mixtures thereof. Carbon particles of graphite are preferred. The binder may desirably be an acrylic, polyvinylchloride, or nitrocellulose. The binder is not intended to be limited to nitrocellulose since other known organic binders for carbon particles would also be suitable. The carbon particles and binder may be admixed with a solvent diluent such as butyl acetate or methylethyl ketone before it is applied. A suitable carbon based coating lacquer is available under the trade designation ECCOCOAT 257 from W. R. Grace & Co. or the equivalent thereof. An alternative suitable carbon based coating mixture is available under the trade designation ELECTRODAG 109 from Acheson Colloids Co. Both of these carbon based coating lacquers are referenced in Canadian patent 1263697. Preferred carbon coating mixtures are ELECTRODAG ED112 carbon lacquer or ELECTRODAG ED109 carbon lacquer from Acheson Colloids Company. The ELECTRODAG ED112 carbon lacquer comprises particulate graphite, acrylic binder, and demineralized water. The ELECTRODAG ED109 carbon lacquer comprises. particulate graphite, polyvinylchloride binder, and methylisobutyl ketone solvent.

The thickness of the carbon coating after it has been applied over the cobalt layer and dried is desirably between about 0.0001 to 0.003 inches (0.0025 and 0.076 mm) advantageously between about 0.0004 and 0.001 inches (0.010 and 0.025 mm).

The above stated improvements in service life are particularly applicable to conventional zinc/$MnO_2$ alkaline cells containing "zero amounts" of added mercury. Zero-added mercury cells contain no added amounts of mercury, but may contain only the residual amount of mercury present in commercially available pure zinc, including the residual amount of mercury, if any, present in the other cell components. The total mercury content in such cells is less than 50 parts mercury per million parts total cell weight, typically less than 10 parts mercury per million parts total cell weight.

It is not intended that the current collector for receiving the tandem cobalt and carbon coatings of the invention be limited to a metal casing for the cell. The tandem cobalt and carbon coatings of the invention may be applied to other metal current collectors, preferably those which have been preplated with nickel. Such other current collectors, for example, may be in the form of a wire mesh (woven or unwoven), expanded metal foil, a metal sheet, at least a plurality of metallic fibers, or metallic particles, which are preferably preplated with nickel. (The current collector is a metal surface in physical contact with an electrode (anode or cathode) and is electrically connected to a cell terminal. The current collector functions to provide a direct path of current flow from the electrode to a cell terminal.)

Surprisingly the percent improvement in service life is greater than if the steel casing, preferably a nickel plated steel casing, was coated with the cobalt or carbon coating alone. Also, surprisingly the percent improvement in the cell's service life is most pronounced during high power application (e.g. 1 Watt pulse) when the cell is completely discharged (e.g., to 0.8 V.) It is not known with certainty why the improvement in useful service life for high power application is greater with the tandem coating (cobalt followed with carbon coating) on nickel plated steel case for an alkaline cell than for like cells having nickel plated casing coated with only carbon or cobalt alone, even if the total coating thickness is the same. It appears that the carbon/cobalt interface and consequently the entire coating resists oxidation and corrosion at high power consumption better than nickel plated steel casing with only carbon or cobalt coating. It would not be expected that a coating having a carbon/cobalt interface could provide better corrosion resistance and higher conductivity for alkaline cell discharge at high power consumption.

The following examples illustrate the invention and advantages derived therefrom. (All compositions are by weight unless otherwise specified.) The performance results for the cells tested in the following examples are summarized in TABLE 1. (All cells were stored at elevated temperature for two weeks to simulate ambient storage for 3 months before the tests were performed.)

EXAMPLE 1

(Pulsed Discharge at Constant Power):

A primary zinc/manganese dioxide alkaline AAA cell, is employed. The AAA cell is prepared with a cell casing formed of steel which is plated on the inside and outside surface with nickel. Conventional cathode and anode active material, electrolyte and separator membrane are employed. The anode material may be in the form of a gelled mixture containing mercury free (zero-added mercury) zinc alloy powder. Such mixture may typically contain aqueous KOH electrolyte solution, gelling agent, e.g. acrylic acid copolymer such as CARBOPOL C940 from B. F. Goodrich; and surfactants e.g. organic phosphate ester surfactant GAFAC RA600 from Rhone Poulenc. Specific formulations of representative zinc slurries are disclosed in European Patent Publication 0474382A1. The separator membrane can be a conventional electrolyte permeable membrane of polyvinyl alcohol/rayon material. The electrolyte is an aqueous solution of KOH containing about 40 wt % KOH and 2 wt % ZnO, hereinafter referred to as "aqueous KOH solution".

The cathode in the cell has the following composition:

Electrolytic manganese dioxide (80–86 wt %), graphite (7–10 wt %), and a 7–11 Normal "aqueous KOH solution" (5–7 wt %).

The cell was discharged first with a pulsed discharge at high power. Specifically the cell was discharged in cycles wherein each cycle comprised of a 3 second drain at constant high power of 1 watt and then for 7 seconds at constant power drain at 0.1 Watt. The cycles were repeated until a cut off voltage of 1.0V is reached (Test 1). The service life recorded for the above cell employing an uncoated nickel plated steel casing was 0.33 hours. The test was continued with the same cell but until a cutoff voltage of 0.8 V was reached (Test 2). The service life recorded was 0.5 hours.

The same tests were performed on AAA cells having identical chemical composition but wherein the cell casing of nickel plated steel was plated on the inside surface with cobalt as described herein. With such can coating the Test 1 service life reported was 0.49 hours and the Test 2 service life was 0.73 hours.

The same tests were performed on AAA cells having identical chemical composition but wherein the cell casing of nickel plated steel was coated on the inside surface with carbon as described herein employing a carbon lacquer available under the trade designation ELECTRODAG 112. With such can coating the Test 1 service life reported was 0.49 hours and the Test 2 service life was 0.78 hours.

The same tests were performed on AAA cells having identical chemical composition but wherein the cell casing of nickel plated steel was plated on the inside surface with cobalt and then subsequently coated with carbon using the same ELECTRODAG 112 carbon lacquer. With such can coating the Test 1 service life reported was 0.56 hours and the Test 2 service life was 0.9 hours.

EXAMPLE 2

(Constant Power Pulsed Intermittent Discharge):

An experimental zinc/$MnO_2$ alkaline AAA cell identical to that referenced in Example 1 is prepared. The cell casing is formed of steel which is plated on the inside and outside surface with nickel.

The cell was discharged using a discharge cycle comprising a pulsed constant power drain at 0.5 Watt for 15 minutes with rest for 45 minutes. The cycle was repeated but until a cut off voltage of 1.1 Volts (Test 3) was reached. The service life reported for the above cell employing an uncoated nickel plated steel casing was 0.41 hours. A like cell was discharged in the same manner until a cut off voltage of 0.9 Volts was reached (Test 4). The service life reported was 1.03 hours.

The same tests were performed on AAA cells having identical chemical composition but wherein the cell casing of nickel plated steel was plated on the inside surface with cobalt as described herein. With such can coating the Test 3 service life reported was 0.51 hours and the Test 4 service life was 1.06 hours.

The same tests were performed on AAA cells having identical chemical composition but wherein the cell casing of nickel plated steel was coated on the inside surface with carbon as above described. With such can coating the Test 3 service life reported was 0.58 hours and the Test 4 service life was 1.07 hours.

The same tests were performed on AAA cells having identical chemical composition but wherein the cell casing of nickel plated steel was plated on the inside surface with cobalt and then subsequently coated with carbon. With such can coating the Test 3 service life reported was 0.61 hours and the Test 4 service life was 1.16 hours.

EXAMPLE 3

(GSM Pulsed Test)

An experimental zinc/$MnO_2$ size AAA alkaline cell identical to that referenced in Example 1 is prepared. The cell casing was formed of steel which has been plated on the inside and outside surface with nickel.

The cell was discharged under conditions simulating the pulsed battery drain experienced during mobile phone use under the Global System Mobile phone system employed in Europe. To simulate such pulsed drain the cell was drained with each cycle comprising drain at 0.7 Amp for 0.55 milliseconds followed by drain at 0.135 Amp for 4.05 milliseconds. The cycles were repeated until a cut off voltage of 1.1 Volts was reached (Test 5). The service life reported for the above cell employing an uncoated nickel plated steel casing was 0.6 hours. The test was continued with the same cell in the same manner but until a cut off voltage of 0.9 Volts was reached (Test 6). The service life reported was 2.90 hours.

The same tests were performed on AAA cells having identical chemical composition but wherein the cell casing of nickel plated steel was plated on the inside surface with cobalt as described herein. With such can coating the Test 5 service life reported was 0.86 hours and the Test 6 service life was 2.73 hours.

The same tests were performed on AAA cells having identical chemical composition but wherein the cell casing of nickel plated steel was coated on the inside surface with carbon employing the ELECTRODAG ED112 carbon lacquer. With such can coating the Test 5 service life reported was 1.34 hours and the Test 6 service life was 3.18 hours.

The same tests were performed on AAA cells having identical chemical composition but wherein the cell casing of nickel plated steel was plated on the inside surface with cobalt and then subsequently coated with carbon employing the same ELECTRODAG ED112 carbon lacquer. With such can coating the Test 5 service life reported was 1.21 hours and the Test 6 service life was 2.94 hours.

EXAMPLE 4

(Continuous Drain at Constant Resistance):

An experimental zinc/$MnO_2$ size AAA alkaline cell identical to that referenced in Example 1 is prepared. The cell casing was formed of steel which has been plated on the inside and outside surface with nickel.

The cell was discharged continuously at a constant resistance of 10 ohm until a cut off voltage of 0.8 volt was reached (Test 7). The service life reported for the above cell employing an uncoated nickel plated steel casing was 8.14 hours (Test 7). Another cell was freshly discharged at a constant resistance of 75 ohms until a cut off voltage of 0.9 volts was reached (Test 8). The service life reported was 70.7 hours.

The same tests were performed on AAA cells having identical chemical composition but wherein the cell casing of nickel plated steel was plated on the inside surface with cobalt as described herein. With such can coating the Test 7 service life reported was 8.18 hours and the Test 8 service life was 70.1 hours.

The same tests were performed on AAA cells having identical chemical composition but wherein the cell casing of nickel plated steel was coated on the inside surface with carbon employing the ELECTRODAG ED112 carbon lacquer. With such can coating the Test 7 service life reported was 7.72 hours and the Test 8 service life was 69.3 hours.

The same tests were performed on AAA cells having identical chemical composition but wherein the cell casing of nickel plated steel was plated on the inside surface with cobalt and then subsequently coated with carbon employing the ELECTRODAG ED112 carbon lacquer. With such can coating the Test 7 service life reported was 8.3 hours and the Test 8 service life was 70.4 hours.

TABLE 1

PERFORMANCE OF AAA ALKALINE CELLS VS. CELL CASING COATINGS

| Test | 1 | 2 | 3 | 4 | 5 | 6 | 7 | 8 |
|---|---|---|---|---|---|---|---|---|
| Test Type | Pulsed[2] 1W/.1W | Pulsed[2] 1W/.1W | Pulsed[3] .5W | Pulsed[3] .5W | GSM[4] Pulse | GSM[4] Pulse | 10 Ohm (Cont.) | 75 Ohm (Cont.) |
| Cutoff Voltage | 1.0V | 0.8V | 1.1V | 0.9V | 1.1V | 0.9V | 0.8V | 0.9V |
| Service Life, Hrs. Cobalt/Carbon[1] | 0.56 | 0.9 | 0.61 | 1.16 | 1.21 | 2.94 | 8.3 | 70.4 |
| Service Life, Hrs. Carbon Coat[1] | 0.49 | 0.78 | 0.58 | 1.07 | 1.34 | 3.18 | 7.72 | 69.3 |
| Service Life, Hrs. Cobalt Coat[1] | 0.49 | 0.73 | 0.51 | 1.06 | 0.86 | 2.73 | 8.18 | 70.1 |
| Uncoated Nickel Plated Steel | 0.33 | 0.56 | 0.41 | 1.03 | 0.6 | 2.90 | 8.14 | 70.7 |

Notes:
[1]All casing coating were made on nickel plated steel.
[2]Each cycle pulse drain at 1W for 3 sec. then 0.1W for 7 sec.
[3]Each cycle pulse (intermmitent) drain at 0.5W for 15 min. then rest for 45 min.
[4]Cell drain to simulate Global System Mobile (GSM) phone drain.

The percent improvement for the different casing coating test is reported against the performance (service life) of the same AAA alkaline cell composition but with uncoated nickel plated steel. It may be seen that the cell casing of nickel steel plated with cobalt in turn coated with carbon shows significantly longer service life at high power drain when compared to cells having an uncoated nickel plated steel casing or cells having a carbon coated or cobalt coated nickel plated steel casing. In particular when the cells with different casing coating were subjected to the pulsed power test 2 (cycle pulse drain at 1 W for 3 seconds then O.1W for 7 seconds) with the cell drained to cutoff voltage 0.8V, the cell having a nickel plated steel casing which was plated with cobalt and then coated with a layer of carbon over the cobalt showed an 60.7% improvement in service life over the service life of a like cell having an uncoated nickel plated steel casing. A like cell having only a carbon coating on the nickel plated steel casing showed a 39.3% improvement in service life over the service life of a cell with an uncoated nickel plated steel casing. And a like cell having only a cobalt plating on the nickel plated steel casing showed only a 30.4% improvement in service life over the service life of a like cell with uncoated nickel plated steel casing.

The cells with carbon/cobalt coated nickel plated steel casing showed the longest service life (compared to any other coated cells tested) for the pulsed 1 W/0.1 W Tests 1 and 2 and the intermittent pulsed 0.5 W Tests 3 and 4, and the 10 ohm continuous drain Test 7. The effect of can coating was not significant in the 75 ohm constant resistance test (Test 8). In the mobile phone GSM simulation tests (Test 5 and 6) the AAA cells having a nickel plated steel casing coated with carbon/cobalt showed greater service life when compared to like cells having an uncoated nickel plated steel case or a nickel plated steel case with a cobalt coating thereon. However, the cells having a nickel plated steel casing coated with carbon alone showed the longest service life in the GSM simulation test.

The invention extends to electrochemical cells other than alkaline cells provided such cells have a metal current collector, preferably a nickel plated metal current collector, which comes into contact with at least one of the anode or cathode electrodes and where oxidation or corrosion of such contact surface of the current collector can occur if the tandem cobalt and carbon coating of the invention is not applied thereto. In such cells the tandem cobalt and carbon coatings on the contact surface of the current collector reduces the chance of corrosion and extends the service life of the cell. Examples of specific types of cells which can benefit from the tandem cobalt and carbon coatings of the invention on the contact surface of such current collector are: all alkaline cells, zinc/air cells, lithium/$MnO_2$ primary cells, nickel metal hydride rechargeable cells, nickel cadmium cells, lithium ion rechargeable cells.

Although the present invention was described with respect to specific embodiments, it should be recognized that variations are possible without departing from the concept of the invention. Thus, the invention is not intended to be limited to the specific embodiments, but rather its scope is reflected by the claims and equivalents thereof.

What is claimed is:

1. An alkaline electrochemical cell comprising a cylindrical steel casing housing the contents of said cell, a positive and a negative terminal, an anode comprising zinc, a cathode comprising manganese dioxide, and aqueous alkaline electrolyte solution, wherein the inside surface of said steel casing is preplated with a layer of nickel, said steel casing being coated on the inside surface with a coating comprising a layer comprising cobalt and a layer comprising carbon, wherein said layer comprising cobalt is applied over said nickel layer and the layer comprising carbon is applied over said cobalt layer.

2. The cell of claim 1 wherein the aqueous electrolyte solution comprises potassium hydroxide.

3. The cell of claim 1 wherein said cathode comprising manganese dioxide is in contact with the inside surface of said steel casing.

4. The cell of claim 1 wherein said cathode comprising manganese, dioxide is in electrical contact with said layer comprising carbon.

5. The cell of claim 1 wherein said layer comprising cobalt has a thickness between about $0.01 \times 10^{-6}$ and $1.0 \times 10^{-6}$ meters.

6. The cell of claim 1 wherein said layer comprising carbon has a thickness between about 0.0025 and 0.076 mm (dry basis).

7. The cell of claim 1 wherein said layer comprising cobalt comprises a cobalt alloy selected from the group consisting of 1) an alloy of nickel and cobalt and 2) an alloy of nickel, cobalt and iron.

8. The cell of claim 1 wherein said nickel and cobalt layers are applied to the inside surface of said metal casing by electrodeposition.

9. The cell of claim 1 wherein said layer comprising nickel and said layer comprising cobalt on said steel are subjected to heat treatment of between about 580 and 710° C. before said coating comprising carbon is applied over said layer comprising cobalt.

10. The cell of claim 1 wherein the layer comprising carbon is formed by coating a dispersion comprising particulate carbon, binder and solvent carrier onto said cobalt layer and allowing the solvent carrier to evaporate.

11. The cell of claim 10 wherein the carbon in said carbon layer comprises particulate graphite.

12. In an electrochemical cell comprising a metal casing housing the contents of said cell, a positive and a negative terminal, an anode and a cathode, wherein one of said anode and cathode is in physical contact with a metal current collector, the improvement comprising:

said metal current collector comprising steel preplated with nickel, at least a portion thereof, being coated with a coating comprising a layer of cobalt (the cobalt layer) and a layer comprising carbon over the cobalt layer, wherein said layer comprising cobalt is applied over said nickel layer and the layer comprising carbon is applied over said cobalt layer, wherein said metal current collector is selected from the group consisting of said metal casing, a wire mesh, a metal foil, a metal sheet, metallic fibers, and metallic particles.

13. The cell of claim 12 wherein the inside surface of said steel casing is preplated with a layer of nickel and said layer comprising cobalt (the cobalt layer) is applied over said nickel layer and the layer comprising carbon is applied over said cobalt layer.

14. The cell of claim 13 wherein said cell is an alkaline cell comprising an anode comprising zinc, a cathode comprising manganese dioxide and an electrolyte comprising potassium hydroxide and said cathode contacts the inside surface of said metal casing.

15. The cell of claim 13 wherein said nickel and cobalt layers are applied to the inside surface of said metal casing by electrodeposition.

16. The cell of claim 15 wherein said layer comprising nickel and said layer comprising cobalt on said steel are subjected to heat treatment of between about 580 and 710° C. before said coating comprising carbon is applied over said cobalt.

17. The cell of claim 13 wherein the layer comprising carbon is formed by coating a dispersion comprising particulate carbon, binder and solvent carrier onto said cobalt layer and allowing the solvent carrier to evaporate.

18. The cell of claim 17 wherein the carbon in said dispersion comprises particulate graphite.

19. The cell of claim 13 wherein said layer comprising cobalt has a thickness between about $0.01 \times 10^{-6}$ and $1.0 \times 10^{-6}$ meters.

20. The cell of claim 13 wherein said layer comprising carbon has a thickness between about 0.0025 and 0.076 mm (dry basis).

* * * * *